Patented Feb. 20, 1934

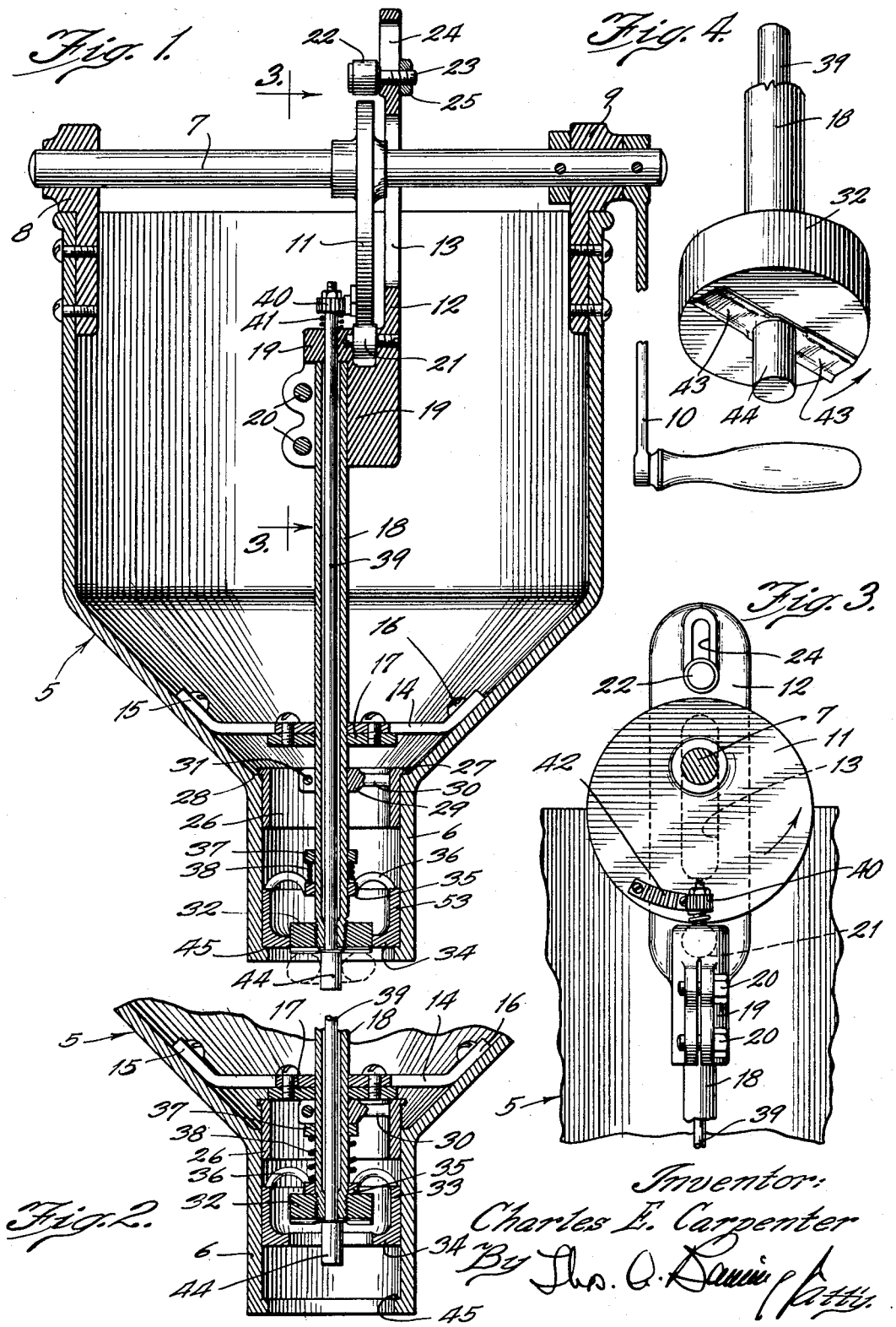

1,948,022

UNITED STATES PATENT OFFICE 1,948,022

DOUGHNUT MACHINE AND THE LIKE

Charles E. Carpenter, Chicago, Ill.

Application May 19, 1932. Serial No. 612,249

13 Claims. (Cl. 107—14)

The present invention has to do with improvements in doughnut machines and the like. The invention herein disclosed has reference particularly to improvements in the doughnut forming and dropping mechanism by means of which the doughnuts are formed and dropped into the frying pan.

One object of the invention is to provide a construction for forming and dropping the doughnuts by the use of a single reciprocating element which is conveniently reciprocated through the desired distance. In this connection it is an object to provide an arrangement whereby this reciprocating element serves to deliver the reciprocating movements to the plunger and cut-off device by means of which the dough batch is segregated and formed into the doughnut. By the use of a construction employing only a single reciprocating device it becomes possible to operate the plunger and valve elements with a minimum of moving parts.

In connection with the foregoing it is a further object of the invention to make provision for operating the plunger and valve elements by friction means in connection with the reciprocating device so that each of said elements operates through its proper travel or stroke of less amount than the reciprocation of said device.

In connection with the foregoing it is a further object of the invention to provide means for adjusting or varying the extent of the reciprocation so that the size of the dough batch is correspondingly adjusted within the desired limits of the operation.

A further object of the invention is to provide means for cleanly and sharply severing the formed doughnut from the valve device so that the doughnut will not cling or adhere thereto. In this connection the device includes a rotating cutter or knife which is actuated in proper timed relationship to the movements of the other parts.

Another object of the invention is to provide a very simple construction of mechanism and one which can be very cheaply manufactured and assembled, and one which will not unduly obstruct the interior of the dough hopper and the delivery throat.

Other objects and uses of the invention will appear from a detailed description of the same which consists in the features of construction and combinations of parts hereinafter described and claimed.

In the drawing:

Figure 1 shows a vertical central section through a machine embodying the features of the present invention, the reciprocating element and other parts being in their lowermost positions;

Figure 2 shows a fragmentary view through the lower portion of the device of Figure 1, the reciprocating parts being shown in their raised positions;

Figure 3 shows a fragmentary section on the line 3—3 of Figure 1, looking in the direction of the arrows;

Figure 4 shows a bottom perspective view of the valve element and immediately related parts.

In the construction shown in the drawing the hopper is designated in its entirety by the numeral 5. It is shown as being provided with a downwardly extending throat 6 within which the doughnut batches are formed and from which they are delivered.

Extending across the upper portion of the device and in proximity thereto is the drive shaft 7. The same is suitably journaled in a pair of brackets 8 and 9 supported at opposite sides of the upper edge portion of the hopper. A crank 10 is connected to the shaft 7 for driving the same.

An eccentric disc 11 is eccentrically mounted upon the shaft 7. A pitman 12 has the slot 13 which receives the shaft 7 so that the pitman can rise and fall without interference from the shaft and at the same time the shaft serves to guide the pitman in its vertical movements.

A bracket 14 is extended across the lower portion of the hopper and the end portions of said bracket are connected to the hopper as shown at 15 and 16 respectively. The central portion of this bracket carries a plate 17 on its bottom face. A sleeve 18 is slidably extended through the bracket 14 and plate 17, and the upper end of said sleeve is firmly gripped by the slit block 19 on the lower end of the pitman 12, a pair of set screws 20 serving to tighten up the slit block in order to grip the sleeve securely. The result is that the sleeve 18 which is a reciprocating element is caused to move up and down with the pitman.

A roller 21 is connected to the lower portion of the pitman 12 and rides against the bottom edge of the disc 11. Another roller 22 is carried by a stud 23 which extends through a slot 24 in the upper portion of the pitman, and lock nut 25 is provided for tightening up said stud at any position of adjustment within the slot 24. The roller 22 rides against the upper edge of the disc 11. Manifestly with this arrangement the pitman and sleeve 18 will always be moved down to the same lower limit of movement, but the upper limit of movement will depend upon the position of adjustment of the stud 23. In this way the reciprocations of the sleeve 18 can be adjusted.

A collar 26 works within the upper portion of the throat 6, said collar being provided with an outwardly extending flange 27 which strikes against a shoulder 28 at the bottom of the hopper so as to limit the downward movement of said collar 26. The collar is itself connected to a hub 29 by means of a series of webs 30, said hub 29 being slit and provided with a set screw 31 by means of which the amount of grip of the hub on the sleeve 18 can be adjusted. As a result thereof the collar 26 is moved up and down due to the frictional engagement of the hub on the sleeve 18. When the collar 26 rises to its upper limit of movement it strikes against the plate 17 as shown in Figure 2 and when it reaches its downward limit shown in Figure 1 its flange 27 is resting against the shoulder 28. At the upper limit of movement of Figure 2 said collar 26 serves to seal off the upper portion of the throat from the lower portion of the hopper in substantially air tight manner.

Threaded on the other lower end of the sleeve 18 there is a valve or plug 32. A collar 33 is slidably mounted within the throat 6 and has an inwardly extending flange 34 which has a central bore of proper size to receive the disc 32. The upper portion of the collar 33 is connected to a central hub or ring 35 by means of a series of arms 36, the ring 35 being slidably mounted on the sleeve 18. A ring 37 is secured on the sleeve 18 above the ring 35, a spring 38 being provided between the rings 35 and 37 and normally tending to separate them as shown in Figure 2.

Within the sleeve 18 there is a rod 39 the upper end of which carries a pinion 40. A spring 41 is placed between the pinion 40 and the lateral extension 19 of the pitman 12, said spring normally tending to raise the rod and pinion slightly. A short segmental gear 42 is placed on the face of the disc 11 in such position that as said disc rotates the segmental gear will engage the pinion and cause the rod 39 to make one or more turns or a partial turn as necessary. The lower end of the rod 39 projects below the disc 32 and rests a light radial cutting plate on plates 43 (see Figure 4 in particular). A block or enlargement 44 on the lower end of the rod 39 holds the cutting plate 43 in place and at the same time limits the upward movement of the rod 39 under the impulse of the spring 41. The plate 43 is so mounted on the rod 39 as to rotate therewith.

With the above arrangement the operation is as follows;

As the crank 10 is turned the rotation of the disc 11 serves to move the sleeve 18 and the rod 39 upwardly from the position of Figure 1. The frictional engagement of the hub 29 with the sleeve 18 causes the collar 26 to rise into engagement with the disc 17 as shown in Figure 2. This seals off the throat from the lower portion of the hopper and the dough contained within the throat and sleeve 26 is thus isolated. As the upward movement of the sleeve 18 and rod 39 continues the disc 32 is carried up, and at the same time the ring 37 rises. Due to the presence of the spring 38 the collar 33 and flange 34 are permitted to lag behind the movement of the disc 32 so that said disc rises away from the flange 34 and causes said flange to be opened as shown in Figure 2. The continued upward movement of the disc 32, accompanied by a simultaneous upward movement of the collar 33 and flange 34 reduces the space available for the dough and causes some of the dough to be extruded out around the disc 32 and through the opening of the flange 34 and around the stud 44.

When the downward movement of the sleeve 18 and rod 39 commences the collar 26 will immediately start moving down due to frictional engagement of the hub 29 with the sleeve 18 so that the space between the sleeves 26 and 33 will remain of reduced size until the flange 27 of the collar 26 strikes the shoulder 28. Thereupon the movement of the collar 26 will cease but the collar 33 and the disc 32 will continue to move down. Finally the flange 34 will strike against the shoulder 45 at the lower end of the throat so as to arrest the downward movement of the collar 33; and the continued downward movement of the sleeve 18 and rod 39 will cause the disc 32 to close the opening in the flange 34 thus cutting off the extruded batch of dough and forming the doughnut around the plug 44. Immediately thereafter the final rotary movement of the disc 11 will cause the segmental gear 42 to rotate the pinion 40 and rod 39 so as to rotate the knives 43 and thus shear the dough batch from the bottom face of the disc 32.

While I have herein shown and described only a single embodiment of my present invention, still I do not intend to limit myself thereto except as I may do so in the claims.

I claim:

1. In a dough batch forming machine the combination of a hopper having a downwardly extending throat, a single vertically extending reciprocable member within the hopper reaching into the throat, means for reciprocating said member vertically, means for adjusting the extent of said reciprocation, a vertically slidable collar in the upper portion of the throat, a friction drive connection between said collar and said member, means for limiting the downward movement of the collar, a stationary stop plate in the lower portion of the hopper in position to be engaged by the collar when the collar is fully raised and while the collar is in engagement with the throat to thereby seal off the throat from the lower portion of the hopper, a second collar slidably mounted in the lower portion of the throat, an inwardly extending flange on said collar, a disc secured to the reciprocable member and serving to enter the flange aforesaid and close the same when the disc is lowered with respect to the collar and flange, a spring connection between said collar and the vertically reciprocable member, and means for limiting the downward movement of said collar with respect to the throat, substantially as described.

2. In a doughnut forming machine the combination of a hopper having a downwardly extending throat, a collar slidably mounted in the upper portion of the throat, a second collar slidably mounted in the lower portion of the throat and having an inwardly extending flange establishing a central opening, a vertically reciprocable member extending downwardly through the hopper and into the throat and through said collars, a disc on the lower portion of said member adapted to enter and seal the opening of the second mentioned collar when the disc is lowered thereinto, a frictional connection between the first mentioned collar and said vertically reciprocable member, and a spring connection between the second mentioned collar and the vertically reciprocable member, substantially as described.

3. In a doughnut forming machine the combination of a dough hopper having a downwardly extending throat, a vertically moveable collar in the upper portion of the throat, a second vertically moveable collar in the lower portion of the throat, means for limiting the downward movement of each of said collars, a stationary stop plate above the first mentioned collar and in position for engagement by said collar when the collar rises, and while said collar maintains engagement with the throat, a vertically reciprocable member within the hopper and extending through the collars, a disc on the lower portion of said member in position to seal the second mentioned collar when the disc is fully lowered with respect thereto, a friction connection between the first mentioned collar and the reciprocable member, and a spring connection between the vertically reciprocable member and the second mentioned collar, substantially as described.

4. In a doughnut forming machine the combination of a dough hopper having a downwardly extending throat, a pair of collars slidably mounted in the upper and lower portions of the throat respectively, means for limiting the downward movement of each of said collars, a stopplate above the upper collar and in position for engagement with said collar when said collar is fully raised and while said collar is in engagement with the throat, a vertically reciprocable member within the hopper reaching through both collars, a disc on said member in position to engage the second mentioned collar to seal the same when fully lowered with respect to said collar, a friction connection between the first mentioned collar and the reciprocable member, a spring connection between the second mentioned collar and the reciprocable member, a rotary knife beneath the disc, and means for rotating the same at the conclusion of the downward movement of the reciprocable member, substantially as described.

5. In a machine of the class described the combination of a dough hopper, a downwardly extending throat in connection with the same, a pair of collars slidably mounted within the throat, means for limiting the downward movement of each of said collars, a stop plate within the hopper in position for engagement by the upper collar, when said collar moves upwardly and while said collar maintains engagement with the throat, a vertically reciprocable member within the hopper, a friction connection between said member and the uppermost collar, a spring connection between the reciprocable member and the lowermost collar, and a disc carried by said reciprocable member in position to enter and close the lower portion of the lowermost collar when the parts are at their lowermost limit of movement, substantially as described.

6. In a machine of the class described the combination of a dough hopper, a downwardly extending throat in connection with the same, upper and lower collars slidably mounted within the throat, means for limiting the downward movement of each of said collars, a vertically reciprocable member within the hopper and extending through the collars, a friction connection between the uppermost collar and said member, a spring connection between the lowermost collar and the reciprocable member, means carried by the reciprocable member for sealing the lowermost collar when the parts are in their lowermost position, and a stationary member above the uppermost collar in position for engagement by said collar when said collar is raised, said collar maintaining engagement with the throat substantially as described.

7. In a device of the class described the combination of a dough hopper, a downwardly extending throat in connection therewith, upper and lower collars slidably mounted within said throat, means for limiting the downward movement of both of said collars, friction means for moving the uppermost collar, spring means for moving the lowermost collar, a stationary member in position for engagement by the uppermost collar when said collar is raised, said collar being in engagement with the throat, and means for positively closing the lowermost collar when said collar is fully lowered, substantially as described.

8. In a machine of the class described the combination of a dough hopper, a downwardly extending throat in connection therewith, upper and lower collars slidably mounted within said throat, means for limiting the downward movement of each of said collars, a vertically reciprocable member, an element carried thereby and adapted to close the lowermost collar when said reciprocable member is fully lowered, friction means for moving the uppermost collar, spring means for moving the lowermost collar, and a stationary member in position for engagement by the uppermost collar when said collar is raised, said collar being in engagement with the throat, substantially as described.

9. In a doughnut forming machine the combination of a dough metering cylinder having a delivery opening at its lower end, a cut off plug working into said opening to thereby cut off the dough delivered through said opening, means for moving said plug with a reciprocating motion with respect to said opening, a cut-off blade bearing against the lower face of said plug, and means for rotating said blade with respect to the plug to thereby cut off the dough from the lower face of the blade, substantially as described.

10. In a doughnut forming machine the combination of a dough metering cylinder having a delivery opening at its lower end, a cut off plug working into said opening to thereby cut off the dough delivered through said opening, means for moving said plug into cutting off position in the opening, a cut-off blade bearing against the lower face of said plug, and means for rotating said blade in contact with the lower face of the plug when the plug is in dough cutting off position, to thereby cut off the dough from the lower face of the plug, substantially as described.

11. In a doughnut forming machine the combination of a dough metering cylinder having a delivery opening at its lower end, a cut off plug working into said opening to thereby cut off the dough delivered through said opening, means for moving said plug into cutting off position in the opening, a cut-off blade bearing against the lower face of said plug, and means for moving said blade across the face of the plug when the plug is in dough cutting off position, to thereby cut off the dough from the lower face of the plug, substantially as described.

12. In a machine of the class described, the combination of a dough metering chamber including a cylindrical chamber and a pair of end sections movable with respect thereto, to thereby vary the volume contained within said chamber, one of said end sections having a delivery opening through which dough batches are delivered, a cut-off plug working within the chamber and through the delivery opening aforesaid to thereby seal the opening and cut off batches of dough delivered through the opening, the other end section serving to establish an inlet opening for entrance of dough batches into the chamber when said section is in one position, and means for moving the end sections with respect to the chamber and for moving the plug with respect to the delivery opening to thereby draw batches of dough into the chamber when the plug is sealingly introduced into the delivery opening, and to deliver the dough batches through said opening when the plug is drawn from the opening into the body of the chamber, substantially as described.

13. In a machine of the class described, the combination of a dough metering chamber including a stationary cylindrical chamber, and a pair of telescoping sections slidably mounted therein, one of said sections being an inlet section and the other being a delivery section, the delivery section being provided with a delivery opening for dough batches delivered therethrough, a plunger working in the chamber and into the delivery opening, and means for moving the end sections and plunger to thereby draw batches of dough into the chamber when the plunger is in the delivery opening to seal the same, and to discharge the dough batches through the delivery opening when the plunger is drawn into the chamber and above the delivery opening, substantially as described.

CHARLES E. CARPENTER.